July 29, 1969

P. F. PADDOCK 3,458,043

FRUIT SIZING APPARATUS

Filed Nov. 1, 1967

INVENTOR
PAUL F. PADDOCK

BY
Paul A. Weilein
ATTORNEY

July 29, 1969    P. F. PADDOCK    3,458,043
FRUIT SIZING APPARATUS

Filed Nov. 1, 1967    7 Sheets-Sheet 4

Fig. 3b.

INVENTOR
PAUL F. PADDOCK
BY
Paul A. Weilein
ATTORNEY

July 29, 1969 P. F. PADDOCK 3,458,043
FRUIT SIZING APPARATUS

Filed Nov. 1, 1967 7 Sheets-Sheet 5

INVENTOR
PAUL F. PADDOCK
BY
Paul A. Weilein
ATTORNEY

INVENTOR
PAUL F. PADDOCK
BY
Paul A. Weilein
ATTORNEY

July 29, 1969

P. F. PADDOCK 3,458,043

FRUIT SIZING APPARATUS

Filed Nov. 1, 1967

INVENTOR
PAUL F. PADDOCK
BY
Paul A. Weilein
ATTORNEY

United States Patent Office 3,458,043
Patented July 29, 1969

3,458,043.
FRUIT SIZING APPARATUS
Paul F. Paddock, Riverside, Calif., assignor to Sunkist Growers, Inc., Los Angeles, Calif., a corporation of California
Filed Nov. 1, 1967, Ser. No. 679,746
Int. Cl. B07c *5/04, 1/10;* B07b *13/04*
U.S. Cl. 209—102
21 Claims

ABSTRACT OF THE DISCLOSURE

The invention relates to an apparatus for sorting fruit by sizes wherein a conveyor means having an upper conveyor run is formed by transverse sizing members which are connected at their opposite ends to linkages which are incorporated in two aparallel continuous sprocket chains which pass around a first drive sprocket means at the head end of the upper run and pass around a second drive sprocket means at the tail end of the upper run. The linkages cooperate with pairs of adjustably spaced cam tracks to control the spacing of the transverse sizing members, the cam tracks acting on the linkages to limit the spacing of the transverse sizing members in response to tensioning of the two sprocket chains thereby determining the spacing between the transverse sizing members. The spacing of the transverse sizing members increases progressively in a sizing zone towards the tail end of the upper run to permit the fruit to drop through the upper run in accord with the sizes of the fruit.

---

The invention adds two supplemental drive sprocket means to actuate the upper run of the conveyor means, which supplemental drive sprocket means are driven in synchronism with the first drive sprocket means, one of the two supplemental drive sprocket means being relatively near the first drive sprocket means and the other supplemental drive sprocket means being at the beginning of the sizing zone. The four drive sprocket means divide the upper run of the conveyor means into three zones, namely, a first zone where the first drive sprocket means and the first supplemental drive sprocket means cooperate to collapse the expanded linkages as they enter the first run thereby to bring the transverse sizing members relatively close together, a second zone between the first supplemental drive sprocket means and the second supplemental drive sprocket means wherein the transverse sizing members are maintained in relatively close spacing to provide a moving conveyor floor for carrying the newly received fruit to the sizing zone, and a third zone which is the sizing zone. By virtue of this arrangement the tension in the upper runs of the two sprocket chains drops abruptly at the end of the first zone and again at the end of the second zone to result in a relatively low average tension along the length of the upper run.

The upper cam tracks of the pairs of spaced cam tracks are made in sections interconnected by control pins that are raised and lowered to change the cam track spacing as required for different runs of fruit. A power actuated control system changes the elevation of all of the cam track control pins simultaneously and counters associated with the various control pins indicate changes in elevations of the control pins in increments of .001 inch so that any particular adjustment of the cam tracks for a particular run of fruit may be recorded for future duplication.

BACKGROUND OF THE INVENTION

The Durand Patent No. 3,038,605 and the Johnson et al. Patent No. 3,244,276 both disclose fruit sizing machines which are constructed in the general manner of a conveyor incorporating transverse sizing rolls which are carried by two continuous parallel sprocket chains on opposite sides of the machine. In the upper run of the conveyor the sizing rolls are initially close together near the head end of the conveyor to receive fruit that is to be sorted by sizes. As the transverse sizing rolls travel towards the tail end of the upper run, the transverse sizing rolls are progressively increasingly spaced apart to permit the fruit to drop therebetween at different stations in accord with the different sizes. To control the spacing of the transverse sizing rolls, each of the two continuous sprocket chains incorporates a continuous series of interconnected linkages each of which may be contracted vertically for horizontal expansion to increase the spacing between the associated transverse sizing rolls and conversely may be vertically expanded for horizontal contraction to reduce the spacing of the associated transverse sizing rolls.

To control the vertical dimensions of the interconnected linkages, the linkages are provided with upper and lower control rollers which engage respectively upper and lower cam tracks. Where it is desirable to increase the spacing of the transverse sizing rolls, the spacing between the two cam tracks is decreased and vice versa.

Since cooperation of the control rollers of the linkages with the cam tracks requires that the sprocket chains be placed in tension, one important problem to which the invention is directed is to minimize the tension required for smooth operation of the upper run. Lowering of the tension that is required in the upper run is desirable not only to promote smooth operation but also because high tension with corresponding high pressure of the control rollers against the cam tracks requires undue power and results in undue wear to make necessary frequent servicing and replacing of parts.

It has been found heretofore that if the two ends of the conveyor mechanism are driven by two independent induction motors and neither motor alone is capable of actuating the conveyor means, the two motors tend to maintain some given degree of sprocket chain tension in the sizing zone and thus permit the spacing of the cam tracks to be adjusted while the apparatus is in operation. If the spacing of the cam tracks is increased in the sizing zone while the apparatus is in operation thereby to decrease the spacing of the transverse sizing rolls, the resulting rise in tension in the sizing zone causes the tail end motor to lag or causes the front end motor to gain or has both effects simultaneously to transfer transverse sizing rolls from the lower run to the upper run. On the other hand, if the spacing of the cam tracks in the sizing zone is decreased to increase the spacing of the transverse sizing rolls, the resulting reduction in tension of the sprocket chains in the sizing zone causes the tail end motor to gain or the front end motor to lag or has both effects, thereby to transfer sizing rolls from the upper run to the lower run.

The problem which is met by the invention is to facilitate changing over from sizing one run of fruit to sizing another run of fruit. For example, the apparatus may be adjusted to size a run of lemons and it may become necessary to change over to sizing a run of oranges or a run of grapefruit. In a fruit sizing apparatus of the present type each adjustable cam track is divided into a series of sections which overlap at their ends with each pair of overlapping ends supported by a single vertically adjustable control pin and the various cam track control pins are usually adjusted individually for changing over from one run of fruit to another run of fruit.

The disadvantage of adjusting the cam track sections individually may be understood from the fact that the cam tracks must always progressively converge throughout the length of the sizing zone to avoid damage to the machine. If any cam track section is inadvertently adjusted to cause local divergence instead of convergency of the cam tracks destructive stresses are created in the linkages that make up the sprocket chain. What is needed is a built-in safeguard to prevent such damage.

Another problem with which the invention deals is that while the two induction motors at the opposite ends of the apparatus readily gain or lag as required to transfer sizing rolls from the upper run to the lower run when the spacing of the cam tracks is decreased, the motors are less responsive to the need for transferring sizing rolls from the lower run to the upper run when the spacing of the cam tracks is increased. The problem is to make the motors readily responsive to both of these needs.

SUMMARY OF THE INVENTION

With reference to the problem of reducing the tension in the sprocket chains in the upper run of a sizing apparatus of the present type, it is to be noted that the upper run is necessarily divided into three zones. In the first zone the linkages are expanded as they issue from the drive sprocket means at the head end of the apparatus; in the second zone the linkages are maintained in expanded state to crowd the sizing rolls together for the purpose of transporting newly received fruit to the third or sizing zone; and in the third or sizing zone towards the tail end of the apparatus the sizing rolls spread apart increasingly to permit the fruit to drop between the sizing rolls onto the transverse discharge belt. To provide vertical clearance for the transverse discharge belt, however, the sizing zone must be elevated substantially above the lower run and, accordingly, the first two zones of the upper run are inclined upwardly to elevate the sizing zone.

To provide the desired control of the spacing of the sizing rolls the upper cam track of each pair of cam tracks diverges upwardly relatively steeply from the head end drive sprocket means to the beginning of the first zone and from there the upper track is inclined upwardly less steeply in the second zone to reach the level of the sizing zone. Thus, there is a crest or change in angle of inclination of each upper cam track at the juncture between the first zone and the second zone and a second crest at the juncture between the second zone and the third zone.

It has been found that the heretofore troublesome excessive tension in the upper run of the apparatus is caused in large part by the fact that each of these two crests of the upper cam tracks creates an abrupt local rise in resistance to travel of the sprocket chains. It is, of course, inherent in the operation of the apparatus that the maximum tension in the sprocket chains occur at the end of the sizing zone where the drive sprocket means at the tail end of the apparatus creates the sizing zone tension. This maximum tension has been unduly high heretofore because the drive sprocket means at the tail end of the apparatus has been given the burden of maintaining tension in the sprocket chains not only in the third sizing zone but also well into the second zone.

The invention teaches that these problems relating to excess tension in the upper run may be solved to result in smooth operation of the whole apparatus, the solution comprising essentially adding a first supplemental drive sprocket means at the first crest of the upper track and a second supplemental drive sprocket means at the second crest of the upper track with these two supplemental drive sprocket means and the head end drive sprocket means actuated synchronously by one of the two induction drive motors.

The two supplemental drive sprocket means cooperate with the first drive sprocket means at the head end of the apparatus and the second drive sprocket means at the tail end of the apparatus to divide the upper track into the three above mentioned zones. In the first zone, the head end drive sprocket means operating at a greater peripheral speed than the first supplemental drive sprocket means causes the expanded linkages to collapse as they issue from the head end drive sprocket means to cause decrease in the spacing of the transverse sizing rolls as they approach the first supplemental drive sprocket means. In the second zone between the two crests in the upper cam tracks the two supplemental drive sprocket means cooperate to keep the sizing rolls spaced relatively close together to provide the required floor for conveying the newly received fruit to the sizing zone. In the third or sizing zone the second supplemental drive sprocket means cooperates with the drive sprocket means at the tail end of the apparatus to keep the sprocket chains under sufficient tension to cause the control rollers of the linkages to maintain continuous contact with the cam tracks as required for controlled progressively increasing spacing of the sizing rolls.

As a result of the described three zone arrangement, there is exceedingly low tension in the sprocket chains in the first zone, the tension rising somewhat towards the end of the zone. At the beginning of the second zone the first supplemental drive sprocket means applies limited pushing force to the two sprocket chains with the result that the tension initially drops to a negative value but tension is restored in the sprocket chains within a short distance and rises to a moderate high at the end of the second zone.

In the third or sizing zone the second supplemental drive sprocket means cooperates with the tail end drive sprocket means to keep the two sprocket chains under continuous tension and, therefore, the second supplemental drive sprocket means resists to a certain degree the travel of the two sprocket chains. Accordingly, the tension of the sprocket chains is at some low value at the beginning of the sizing zone and rises as usual to a maximum at the end of the sizing zone. It is to be noted, however, that the maximum tension at the end of the sizing zone is greatly reduced because of the addition of the two supplemental drive sprocket means, the tension in the sizing zone being isolated from the tension in the first two zones.

The problem of avoiding destructive stresses that may be created by erroneous adjustment of one cam track section relative to the other cam track sections, i.e., by failure to maintain progressive convergence of the cam tracks in the sizing zone is met by interlocking all of the adjustable cam track sections for simultaneous adjustment, the interlocking relationships being such as to assure progressive convergence of the cam tracks throughout the whole range of adjustment.

A certain problem is encountered in carrying out this concept in that the changeover from a run of one kind of fruit to a run of another kind of fruit requires that the cam track control pins travel at different rates. This problem is solved by employing different transmission mechanisms for raising and lowering the different cam track control pins with different rates of travel for the control pins built into the different transmission mechanisms.

The invention teaches that the time required for making changeovers may be further reduced by providing index means whereby particular adjustments of the cam track control pins for particular runs of fruit may be recorded and quickly duplicated when desired. In the preferred practice of the invention, suitable counters are operatively associated with the various cam track control pins, the numerals of the counters indicating the adjustment of the cam track control pins in increments of .001 inch. When a given upper cam track configuration is found to be satisfactory for a run of a given kind of fruit, it is a simple matter to record the displayed numerals on the counters for future reference.

The problem of making the two induction motors at the two opposite ends of the apparatus substantially equally responsive to the need for transferring sizing rolls from the lower run to the upper run and the opposite need of transferring sizing rolls from the upper run to the lower run, is solved by providing means to lower the power output of the induction drive motor at the tail end of the apparatus whenever an adjustment of the cam tracks in the sizing zone creates a demand for more transverse sizing rolls in the sizing zone. Reducing the power output of the tail end motor permits the tail end induction motor to lag readily relative to the front end induction motor to facilitate the required transfer of sizing rolls from the lower run to the upper run.

The features and advantages of the invention may be understood by reference to the following detailed description and the accompanying drawings.

BRIEF DESCRIPTION OF THE DRAWINGS

In the drawings which are to be regarded as merely illustrative.

DESCRIPTION OF THE PREFERRED EMBODIMENT

The presently preferred embodiment of the invention is generally similar to the disclosure of the foregoing Johnson et al. Patent No. 3,244,276 which disclosure is hereby incorporated into the present disclosure by reference.

Figure 2:
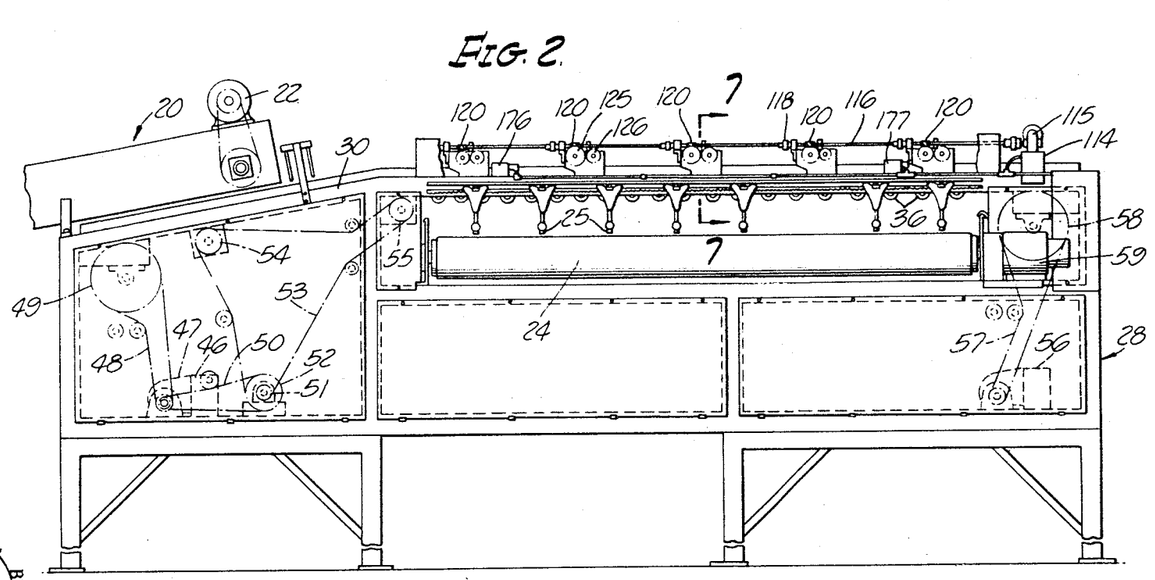
FIG. 2 is a side elevation of the apparatus.
Figures 3A, 11:
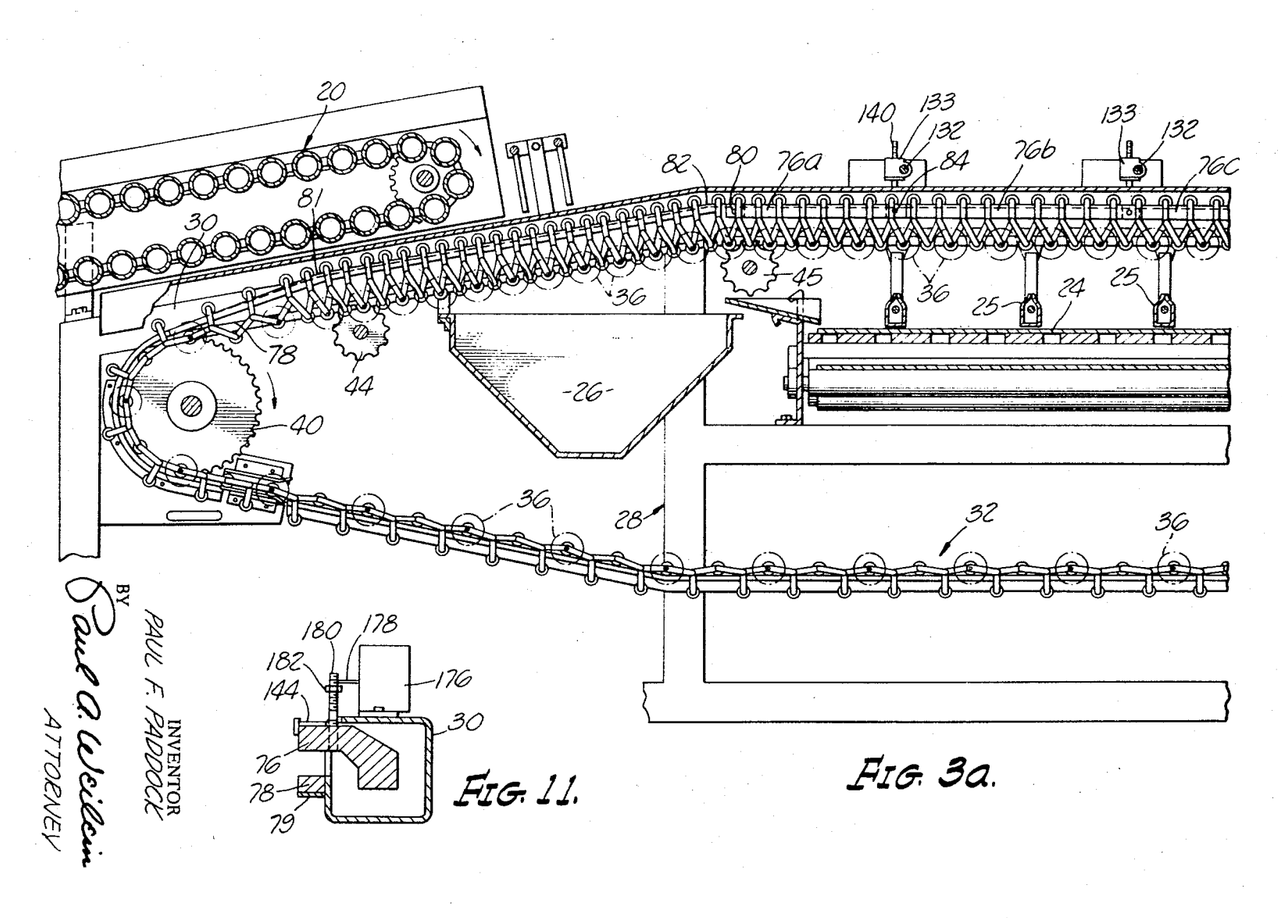
FIGS. 3a and 3b together constitute an enlarged side elevation of the apparatus with side cover plates removed to show details of the upper and lower runs.
FIG. 11 is a fragmentary sectional view showing how a limit switch cooperates with the adjustable upper cam track.

As shown in FIGS. 2 and 3a, a feed conveyor generally designated 20 actuated by a motor 22 delivers fruit onto the upper run of the fruit sizing apparatus near the head end thereof to be conveyed thereon to a sizing zone of the apparatus where the fruit is classified according to size and is dropped onto a transverse discharge belt 24 where the different sizes are separated by adjustable partitions 25. Leaves, twigs, small fruit, and any foreign matter that may be present drop into a bin 26 (FIG. 3a) before the fruit is sized.

Figure 7:
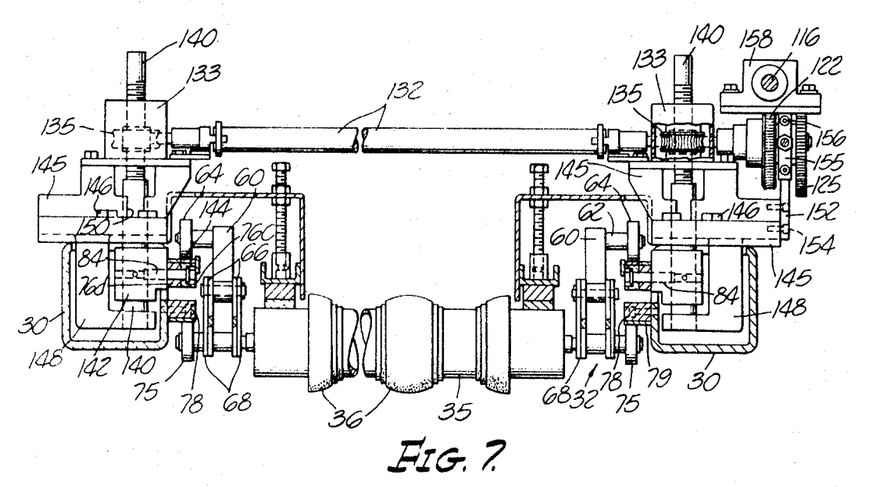
FIG. 7 is a broken sectional view along the line 7—7 of FIG. 2 showing how control rollers of the linkages cooperate with the upper and lower cam tracks.

The moving parts of the fruit sizing apparatus are carried by a frame, generally designated 28, which includes a pair of upper hollow longitudinal side members 30 of rectangular cross sectional configuration, the side members being shown in cross section in FIGS 7 and 11. The moving parts of the apparatus include a pair of endless sprocket chains on opposite longitudinal sides, respectively, of the apparatus, which sprocket chains are generally designated by numerals 32 in FIGS. 3a and 3b and which carry a continuous series of transverse sizing rolls 35. The sizing rolls 35 extend across the width of the apparatus and, in a well-known manner, are provided with rubber sleeves 36 (FIGS. 1 and 7) for yielding contact with the fruit and for orienting fruit of oblong configuration.

Figure 3B:
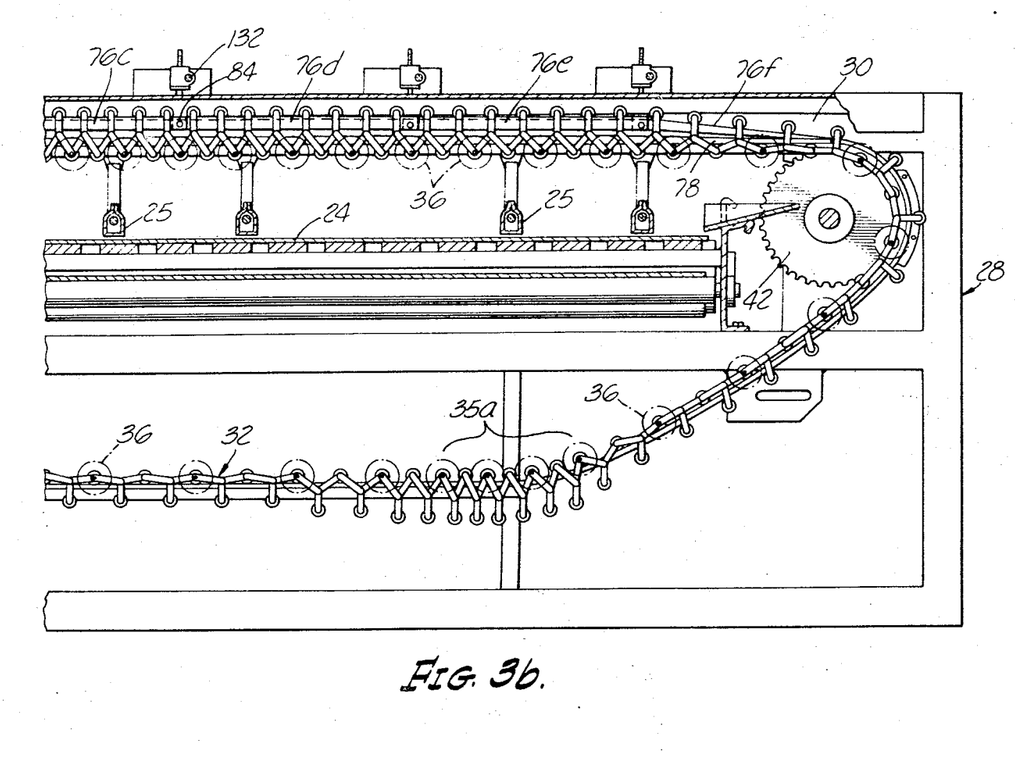

As shown in FIGS. 3a–3b, various pairs of drive sprockets engage the two sprocket chains 32, each of which pairs may conveniently be referred to as a drive sprocket means. A first drive sprocket means 40 at the head end of the conveyor and a similar second drive sprocket means 42 at the tail end of the machine divide the two endless sprocket chains 32 into an upper run where the actual sizing is accomplished and a lower return run. A first supplemental drive sprocket means 44 and a second supplemental drive sprocket means 45 are operatively connected with the head end drive sprocket means 40 for operation in synchronism therewith. Thus, the means for actuating the chain may be broadly described as comprising drive sprocket means at the head end of the apparatus comprising the three drive sprocket means 40, 44, and 45 and a second drive means at the tail end of the apparatus comprising the drive sprocket means 42.

As shown in FIG. 7, a first actuating means in the form of an induction motor 46 and associated reduction gearing in a gear box 47 actuates a chain 48 to drive a large sprocket 49 thereby to actuate the previously mentioned first drive sprocket means 40. To drive the two supplemental drive sprocket means 44 and 45, the first induction motor 46 also actuates a chain 50 which actuates a pair of sprockets 51 and 52 to drive a chain 53 which actuates two sprockets 54 and 55 that are connected to the two supplemental drive sprocket means, respectively. It is apparent that the peripheral speed of the first or head end drive sprocket means 40 is greater than the peripheral speeds of the two supplemental drive sprocket means 44 and 45. A second actuating means in the form of an induction motor 56 actuates the second drive sprocket means 42 by means of a chain 57 and a large sprocket 58 on the same shaft as the second drive sprocket means. An additional motor 59 actuates the transverse discharge belt 24.

Figure 4:
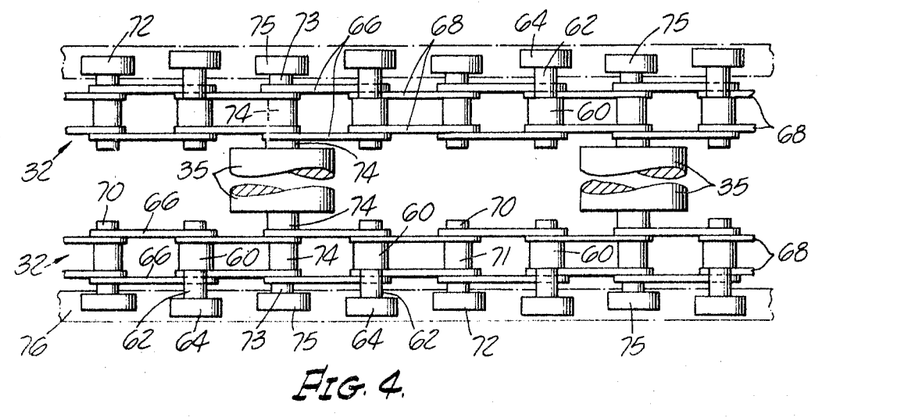
FIG. 4 is a fragmentary broken plan view of the two sprocket chains on the two opposite sides of the apparatus together with the sizing rolls carried thereby.
Figure 5:
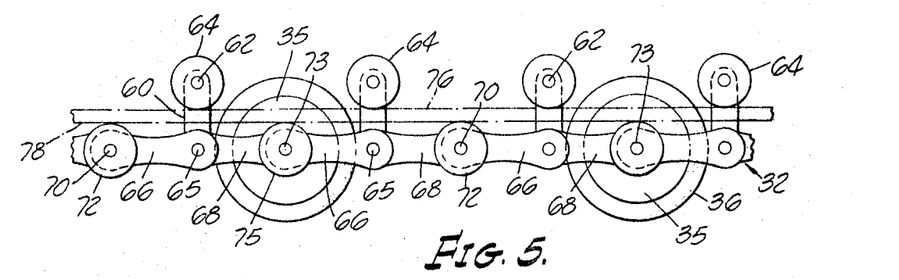
FIG. 5 is a side elevation of the structure shown in FIG. 4, the linkages being vertically contracted and horizontally extending for maximum spacing of the sizing rolls.
Figure 6:
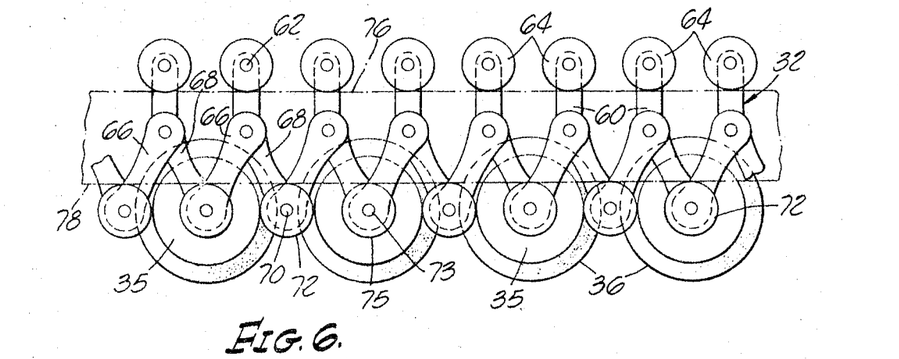
FIG. 6 is an elevational view similar to FIG. 5 showing the linkages expanded vertically and contracted horizontally to reduce the spacing between the sizing rolls.

Each of the two main sprocket chains 32 of the apparatus is formed by a series of linkages, each linkage comprising three interconnected links as will now be described. Referring to FIGS. 4, 5, and 6, each linkage of an endless sprocket chain 32 includes a single relatively thick central link 60 which has at its outer end a stub shaft 62 carrying what may be termed an upper control roller 64. The inner end of the central link 60 which is the lower end as viewed in FIGS. 4 and 5 carries a pivot pin 65 by which it is connected to ends of two oppositely extending links 66 and 68. As best shown in FIG. 4, each of the links 66 and 68 comprises a pair of members that straddle the central link 60. The outer ends of the links 66 and 68 of successive linkages are connected to alternate pivot means. One of the alternate pivot means 70 carries a spacer collar 71 and a lower control roller 72; the other pivot means is in the form of a stub axle 73 that carries a spacer collar 74 and supports one end of a corresponding transverse sizing roll 35. Thus, as may be seen in FIGS. 5 and 6, the successive sizing rolls 35 are spaced apart and are interconnected by two of the three-link linkages.

Each of the stub axles 73 carries a second lower control roller 75. Thus, there are three control rollers associated with each linkage, namely, a single upper control roller 64 and a pair of spaced lower control rollers 72 and 75. As indicated in FIGS. 5 and 6, the series of upper control rollers 64 ride on the surface of an upper cam track which is designated by numeral 76 in the drawings and is represented by broken lines 76 in FIGS. 5 and 6. In like manner, the lower control rollers 72 and 75 travel along the underside of a second lower cam track which is designated 78 in the drawings and is represented by broken lines 78 in FIGS. 4 and 5. As shown in FIG. 7, the two lower cam tracks 78 on opposite sides of the apparatus are fixedly mounted on the previously mentioned side members 30 and the undersides of the lower cam tracks are provided with liners 79. It is apparent that when the two cam tracks 76 and 78 are spaced close together as shown in FIG. 5, the various linkages are fully extended for maximum spacing between successive transverse sizing rolls 35 and when the two cam tracks are at maximum spacing as shown in FIG. 6, the linkages are collapsed or contracted for minimum spacing of the transverse sizing rolls.

Referring to FIGS. 3a and 3b, the linkages are extended for maximum spacing of the transverse sizing rolls 35 when the two sprocket chains pass around the head end drive sprocket means 40 and around the tail end drive sprocket means 42. On the other hand, the sprocket chain linkages are contracted as they pass the first supplemental drive sprocket means 44 and the second supplemental drive sprocket means 45. It is apparent that the head end drive sprocket means 40 and the tail end drive sprocket means will engage not only the collars 71 and 74 on the pivot means 70 and stub axles 73 of the linkages, but will also engage the inner rounded ends of the central links 60. On the other hand, when the linkages are contracted as shown in FIG. 6 as they pass each of the supplemental drive sprocket means 44 and 45, the central links 60 are elevated clear of the two supplemental drive sprocket means so that the two supplemental drive sprocket means engage only the collars 71 on the pivot means 70 and the collars 74 on the stub axles 73.

Since the same number of transverse sizing rolls 35 passes each of the various drive sprocket means in a unit of time and since the transverse sizing rolls are at maximum spacing as they pass around the head end drive sprocket means 40, the peripheral speed of the head end drive sprocket means 40 exceeds the peripheral speed of the supplemental drive sprocket means 44. The difference in peripheral speeds is sufficient to cause the linkages to collapse before they reach the first supplemental drive sprocket means as may be seen in FIG. 3a.

The four drive sprocket means 40, 42, 44, and 45 divide the upper run of the conveyor mechanism into three zones, namely, a first zone between the first drive sprocket means 40 and the first supplemental drive sprocket means 44, a second zone between the first supplemental drive sprocket means 44 and the second supplemental drive sprocket means 45, and a third zone which is the sizing zone between the second supplemental drive sprocket means 45 and the tail end drive sprocket means 42. In the first zone the sprocket chain linkages are successively collapsed to bring the transverse sizing rolls 35 relatively close together as shown. In the second sizing zone the transverse sizing rolls 35 are maintained in closely spaced relationship for the purpose of carrying the newly received fruit to the sizing zone.

The upper and lower cam tracks 76 and 78, respectively, converge close to the head end drive sprocket means 40 and diverge towards the first supplemental drive sprocket means 44 in accord with the desired collapsing of the linkages to bring the transverse sizing rolls 35 relatively close together. The upper and lower cam tracks 76 and 78 are uniformly spaced far apart throughout the second zone. In the third zone the upper cam track 76 is progressively lowered to reduce the vertical spacing between the two cam tracks, thereby to progressively space apart the transverse sizing rolls 35 to cause progressively larger sizes of the fruit to drop between the successive sizing rolls onto the transverse discharge belt 24.

To make it possible to vary the degree to which the spacing between the upper and lower cam tracks 76 and 78 is progressively reduced along the sizing zone, the upper cam track 76 is divided into six separate sections 76a, 76b, 76c, 76d, 76e, and 76f as shown in FIGS. 3a and 3b. The first end of each of the first sections 76a is slotted for sliding engagement with a fixed support pin 80 and the far end of the last cam track section 76e is tapered and is slidingly supported by the lower cam track 78. This progressive convergence of the upper and lower cam tracks 76 and 78 as they approach the tail end drive sprocket means 42 permits the linkages to fully expand as they approach the rear end drive sprocket means 42.

Referring to FIGS. 3a and 3b, it can be seen that the upper run slopes upwardly in the first two zones because the third zone must be relatively high for adequate clearance over the discharge belt 24 and it can also be seen that the inclination is greater in the first zone than in the second zone. As a result the upper track 76 on each side of the apparatus has a first crest 81 in the region indicated by numeral 81 and a second crest in the region indicated by the numeral 82. It has been found that both of these crests tend to impede the travel of the sprocket chains and thus tend to prevent smooth operation of the apparatus. The location of the two supplemental drive sprocket means 44 and 45 near these crests respectively results in smooth stable operation of the apparatus.

The adjacent ends of the six successive upper track sections 76a–76f overlap and are interconnected by vertically adjustable control pins 84, there being five control pins along each longitudinal side of the sizing zone of the upper run of the apparatus. Means for raising and lowering the various control pins 84 simultaneously will be described later.

Since the drive sprocket means 40, 44, and 45 at the head end of the apparatus are interconnected for synchronous operation, there is always a given number of the transverse sizing rolls 35 occupying the first two zones. The number of sizing rolls 35 that occupy the third sizing zone, however, varies with the adjustment of the spacing of the successive sections of the upper cam track 76, it being necessary to decrease the number of sizing rolls in the sizing zone when the vertical spacing between the two cam tracks is reduced and it being necessary to add sizing rolls when the vertical spacing between the two cam tracks is increased.

To permit increasing or decreasing the number of sizing rolls 35 in the sizing zone, surplus sizing rolls are kept in storage in the lower run, the stored sizing rolls being generally indicated by numeral 35a in FIG. 3b. Sizing rolls 35 may be transferred from storage to the upper run of the two sprocket chains by the front drive sprocket means 40 gaining on the rear drive sprocket means 42 or by the rear drive sprocket means 42 lagging relative to the front sprocket or by both actions simultaneously. On the other hand, sizing rolls may be transferred from the upper run to storage in the lower run by the front drive sprocket means 40 lagging relative to the rear drive sprocket means 42 or by the rear drive sprocket means 42 gaining on the front drive sprocket means or by both actions simultaneously.

The first induction motor 46 and the second induction motor 56 are supplied with power in such manner that they automatically respond to changes in tension of the sprocket chains in the sizing zone and thus respond to changes in the spacing of the two cam tracks 76 and 78 in the sizing zone to automatically transfer sizing rolls 35 from storage to the upper run or from the upper run to storage as may be required. For this purpose the two induction motors 46 and 56 may be supplied with power in the manner indicated by the wiring diagram in FIG. 13.

Figure 13:
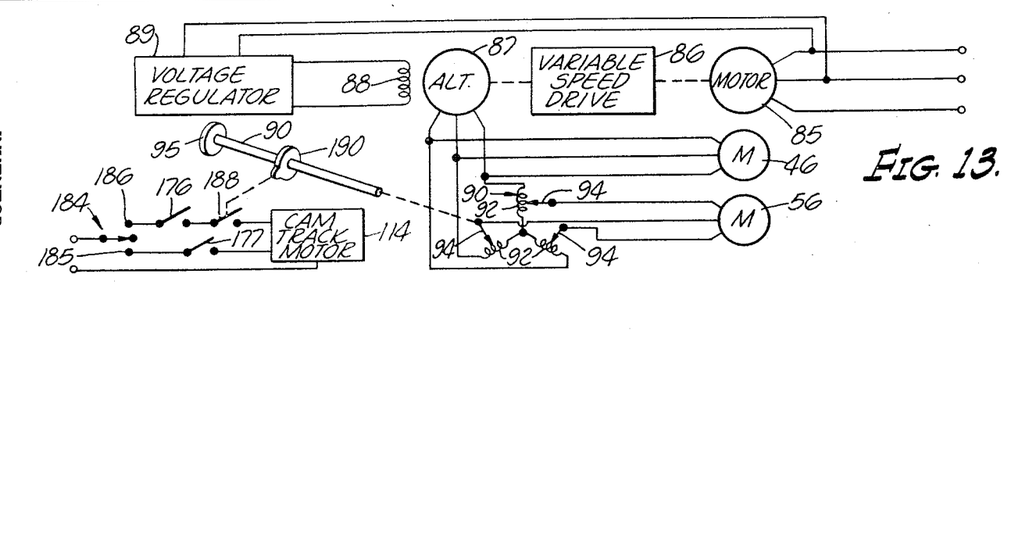
FIG. 13 is a wiring diagram showing how the two induction motors of the apparatus are supplied with power and showing how the cam track control motor is prevented from increasing the spacing of the cam tracks unless the power delivered to the second induction motor is temporarily reduced.

In FIG. 13 a main motor 85 is provided with a variable speed drive 86 for variably driving an alternator 87 having a field coil 88. The speed of the alternator 87 may be varied at will to control the frequency of the current supplied by the alternator and the speed of the two induction motors 46 and 56 varies with the frequency of the current supplied by the alternator. With this arrangement, it is possible to drive the sizing conveyor at any desired speed. The voltage output of the alternator 87 and thereby the power output of the two induction motors is controlled by employing a voltage regulator 89 to vary the strength of the direct current in the field coil 88.

In operation the power delivered to the two induction motors 46 and 56 is reduced so that neither motor has sufficient power to drive the sizing conveyor by itself, but the two motors together do have sufficient power. The second or tail end sprocket drive means 42 requires only moderate power since it merely maintains the sprocket chains in the sizing zone under tension and is helped by gravity pulling on the sizing rolls as they descend to the lower run. On the other hand, the front end drive sprocket means 40 and the two supplemental drive sprocket means 44 and 45 must not only actuate the lower run but also must lift sizing rolls from the lower run to the upper run and then move the sizing rolls through the first two zones. Accordingly, more power is supplied to the front end drive sprocket means 40 and the two supplemental drive sprocket means 44 and 45 than to the tail end drive sprocket means 42.

In a typical installation approximately twice as much power or torque is delivered by the front end drive sprocket means 40 and the two supplemental drive sprocket means than by the rear end drive sprocket means 42. Thus, approximately one-third of the total load is normally carried by the rear end drive sprocket means 42 and two-thirds of the total load is normally carried by the drive sprocket means 40, 44, and 45. When the two induction motors 46 and 56 are balanced to share the load in this manner, any change in the tension of the sprocket chains in the sizing zone varies the proportions of the load carried by the two motors and the two motors react to the changes in the proportions of the total load in the desired manner to maintain the tension of the sprocket chains in the sizing zone within narrow limits, sizing rolls being transferred to and from storage automatically as required.

Figure 12:
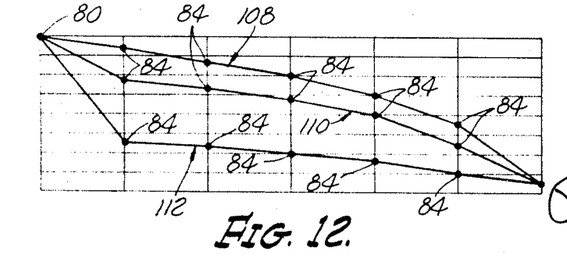
FIG. 12 is a graph showing an increment of .001 inch the adjustments of the cam track control pins for different cam track configurations as required for different runs of fruit.

As shown in FIG. 13, the two induction motors 45 and 56 are wired in parallel and the normal proportioning of the load between the two induction motors is determined by a control generally designated 90. As shown in FIG. 12, the control 90 incorporates three Y-connected coils 92 with associated adjustable wiper contacts 94. A manually operable knob 95 on a control shaft 96 may be manipulated to shift the three wiper contacts 94 simultaneously for varying the proportioning of the total load between the two induction motors.

When the upper cam track sections 76a–76f are adjusted to increase their spacing from the lower cam track 78, the consequent horizontal contraction of the linkages in the sizing zone increases the tension in the sizing zone and thereby increases the load imposed on the second induction motor 56 by the second or tail end drive sprocket means 42. The second induction motor 56 reacts to the increased load by lagging relative to the first induction motor, thereby to cause transverse sizing rolls to be transferred from storage to the sizing zone. At the same time, the change in the proportions of the load imposed on the two induction motors may cause the first induction motor to accelerate slightly for added effect in transferring sizing rolls to the upper run. On the other hand, decreasing the spacing of the upper cam track 76 from the lower cam track 78 permits the linkages in the sizing zone to expand horizontally and thus reduce the tension of the sprocket chains in the sizing zone. The reduced tension in the sizing zone changes the proportions of the total load carried by the two induction motors and in reaction to the change in the proportioning of the total load the second induction motor 56 speeds up to transfer sizing rolls from the upper run to storage and the first induction motor may at the same time slow down slightly with the same effect.

The importance of dividing the upper run of the conveyor into three zones may be appreciated when it is considered that in any zone where the two cam tracks 76 and 78 are depended upon to control the spacing of the transverse sizing rolls 35, tension is required to keep the upper control rollers 64 in firm contact with the upper cam track 68 and at the same time to keep the lower control rollers 72 and 78 in firm contact with the underside of the lower track 78. The described arrangement of the four drive sprocket means dividing the upper run into three zones minimizes the tension required in the sprocket chains in the upper run and greatly reduces the wear of the parts.

Figure 8:
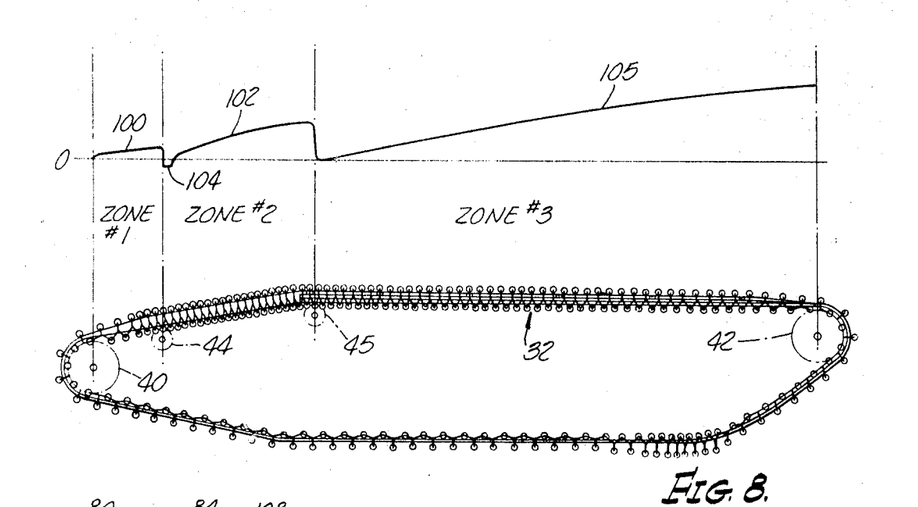
FIG. 8 is a diagrammatic view showing how the upper run of the apparatus is divided into three zones and further indicating how the tension in the sprocket chains varies in the three zones.

The manner in which tension in the sprocket chains in the upper run of the conveyor is minimized may be understood by reference to the diagram in FIG. 8. In the first zone where the front end drive sprocket means 40 causes the extended linkages to collapse, the two cam tracks 76 and 78 diverge as heretofore stated. The first supplemental drive sprocket means 44 causes the two sprocket chains in the first zone to be placed under tension in the general manner indicated by the curve 100 in FIG. 8. Even though the transverse sizing rolls 35 travel uphill in the first zone and thus gravitationally oppose the first supplemental drive sprocket means 44, the tension is relatively low largely because the weight of the transverse sizing rolls tends to cause the linkages to collapse and thus tends to space the upper control rollers 64 from the lower control rollers 72 and 75, the control rollers tending to spread apart in accord with the divergence of the two cam tracks in this first zone.

In the second zone the tension of the two sprocket chains is indicated by the curve 102 and it is to be noted that an initial portion 104 of this curve is negative, which is to say that the first suplemental drive sprocket means 44 exerts pushing force on the first few linkages. The remaining linkages are under tension with the tension gradually rising to the second supplemental drive sprocket means 45.

In the third or sizing zone the two sprocket chains are maintained under sufficient tension by the tail end drive sprocket means 42 to cause the control rollers 64, 72, 75 of the linkages to maintain positive contact with the two cam tracks for accurately controlled progressively wider spacing of the transverse sizing rolls 35. As indicated by the curve 105, the tension in the sizing zone rises from a small magnitude at the second supplemental drive sprocket means 45 to a maximum at the tail end drive sprocket means 42. It is to be emphasized, however, as a major feature of the invention that the maximum tension in the sizing zone and the average tension for the three zones are substantially lower than they would be in the absence of the two supplemental sprocket drive means 44 and 45.

CAM TRACK CONTROL SYSTEM

In a manner that will be explained later, each of the vertically adjustable control pins 84 for raising and lowering adjoining ends of sections of the upper track 76 is vertically adjustable with associated indicating means showing increments of change of elevation in thousandths of an inch. Thus, when particular adjustments of the control pins 84 at the five stations are found to be suitable for sizing a particular run of fruit, the various adjustments in thousandths of an inch may be recorded for future reference to permit the adjustments to be duplicated whenever desired.

FIG. 12 shows diagrammatically how the various control pins 84 may be adjusted in increments of thousandths of an inch for sizing lemons, oranges, and grapefruit, the upper curve 108 representing adjustments for a run of lemons, the intermediate curve 110 representing the adjustments for a run of oranges, and the lower curve 112 representing the adjustments for grapefruit. The five control pins 84 on one side of the machine are indicated in FIG. 1.

An important feature of the invention is the provision of a single master control to cause simultaneous adjustment of the five control pins 84 on each side of the machine as required, for example, to shift from the adjustment represented by one of the three curves 108, 110 and 112 to an adjustment represented by another of the three curves. It is to be noted that in changing from the adjustments of the control pins 84 for the upper curve 108 for sizing lemons to either of the adjustments represented by the lower curve 110 and 112, respectively, the various control pins 84 must travel at different rates in response to the centralized control.

Figure 9:
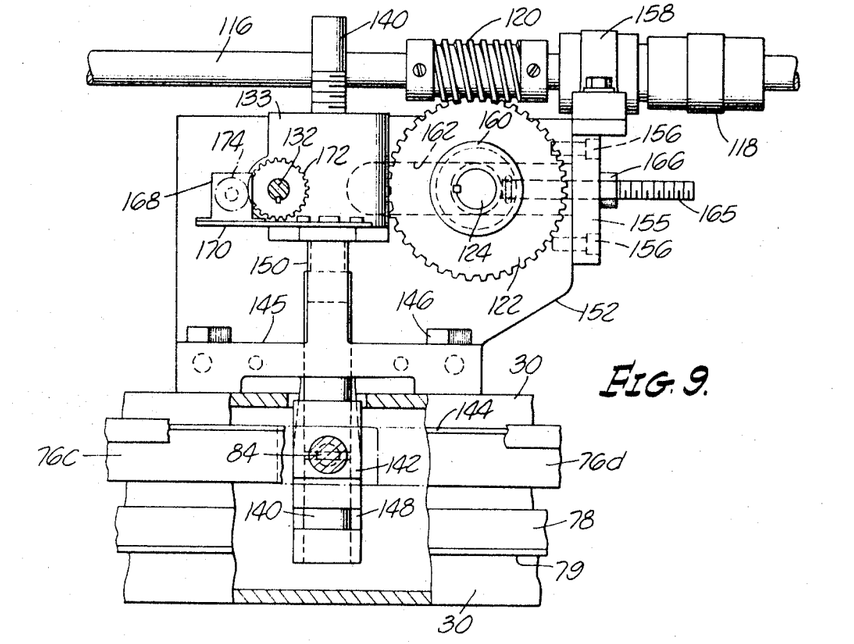
FIG. 9 is an enlarged elevational view partly in section showing a mechanism for raising and lowering a control pin for varying the configuration of the upper cam track.
Figure 10:
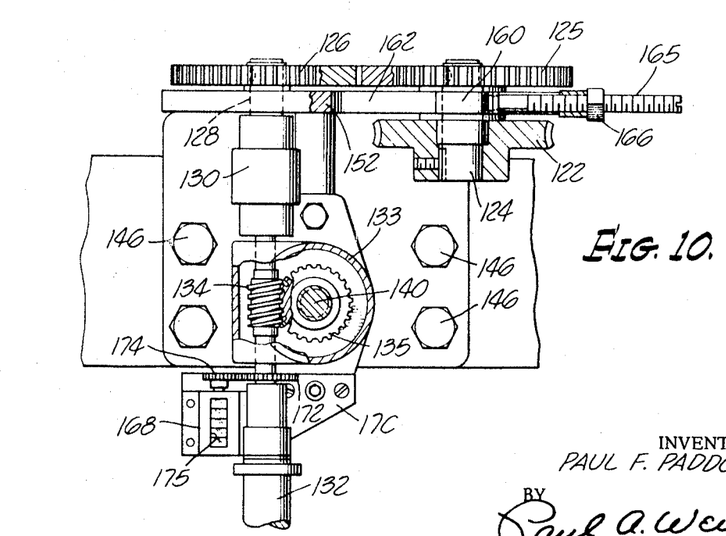
FIG. 10 is a plan view of the mechanism shown in FIG. 9 with parts broken away.

For centralized control of the cam tracks, a motor 114 (FIGS. 1 and 2) for simultaneous adjustment of the various control pins 84 has an associated gear box 115 for actuating a longitudinal control shaft 116, the control shaft being divided into five sections joined by suitable couplings 118. Each of the five sections of the control shaft 116 carries a corresponding worm 120 which, as best shown in FIG. 9, is in mesh with a corresponding worm gear 122 for raising or lowering a pair of corresponding control pins 84 on opposite sides, respectively, of the apparatus. As best shown in FIG. 10, each of the five worm gears 122 is keyed to a corresponding stub shaft 124 which carries a drive pinion 125 that meshes with an associated driven pinion 126. Each of the driven pinions 126 is on a stub shaft 128 that is connected by a coupling 130 with a corresponding cross shaft 132.

Figure 1:
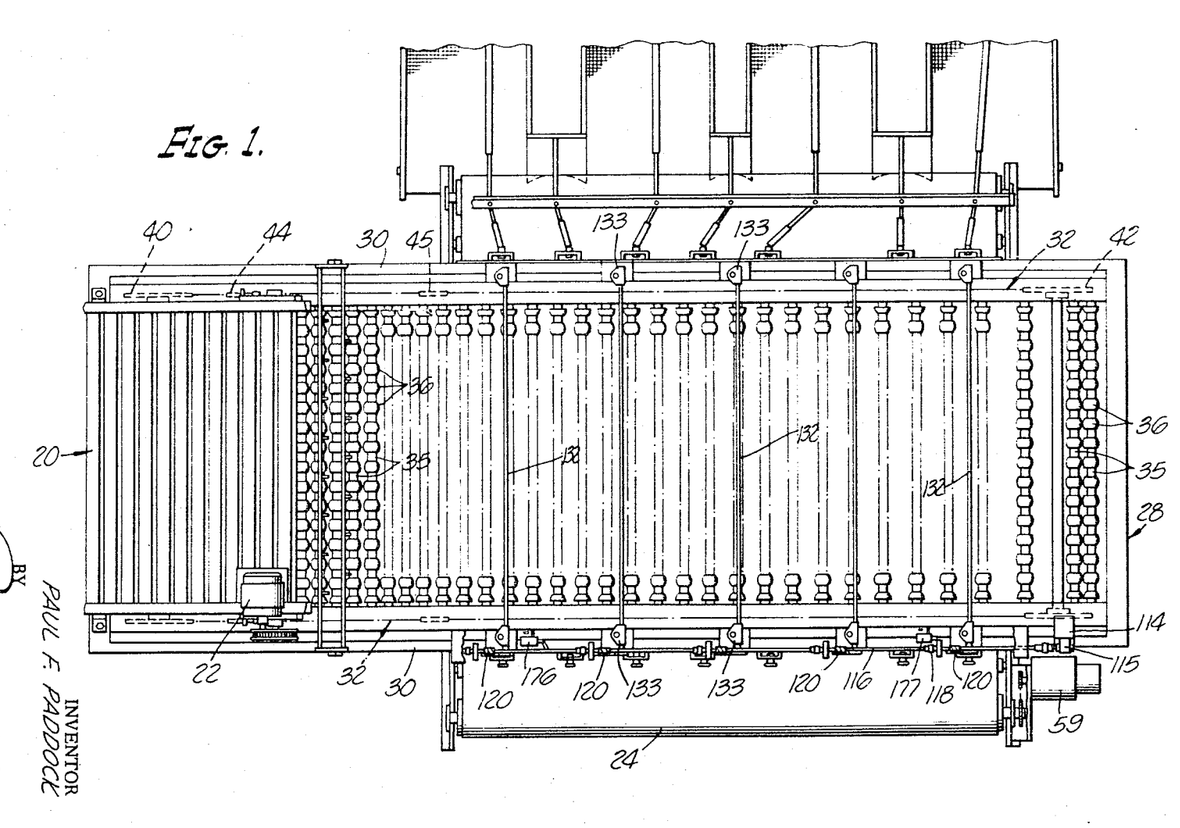
FIG. 1 is a plan view of the principal structure of the presently preferred embodiment of the fruit sizing apparatus.

Referring to FIGS. 2, 3a, and 3b, each of the five cross shafts 132 is at a level above the upper run of the sizer and as shown in FIGS. 1 and 7 each cross shaft extends into two housings 133 on the two opposite sides, respectively, of the apparatus, the cross shaft having a worm gear 134 (FIG. 10) in each housing to raise and lower the corresponding track control pin 84. Each of the two worms 134 of a cross shaft 132 meshes with a corresponding actuating nut 135 that is journalled in the corresponding housing 133.

Each of the five actuating nuts 135 on each longitudinal side of the apparatus engages an upper screw threaded portion of a vertically movable post 140 which carries a corresponding control pin 84. As best shown in FIG. 7, what may be termed a lift block 142 is fixedly mounted on each post 140 with the corresponding control pin 84 extend laterally from the lift block. FIG. 7 shows, for example, how a control pin 84 pivotally interconnects the overlapping ends of two upper cam track sections, in this instance track sections 76c and 76d, respectively. FIG. 7 also shows that the upper cam track 76 has an upper liner plate 144.

Each of the vertically movable posts 140 is slidingly guided by a bracket casting 145 that is mounted by cap screws 146 on the upper side of a previously mentioned side member 30 of the apparatus frame. The bracket casting 145 has a downwardly extending angular arm 148 that is apertured to guide the lower end of the post 140 and the guide casting is further formed with a pair of spaced upwardly extending wings 150 which are shaped to cooperate to guide the upper portion of the post. Each of the ten housings 133 for journalling a corresponding actauting nut 135 is mounted on the upper edges of the two upwardly extending wings 150 of a bracket casting 145.

On one longitudinal side of the apparatus, each of the worm gears 120 of the longitudinal control shaft 116 and the associated drive pinion 125 and driven pinion 126 are mounted on an upright plate 152 which, as shown in FIG. 9, is mounted on the outer side of the corresponding bracket casting 145 by suitable screws 154. As shown in FIGS. 7 and 8, an upwardly extending bracket 155 is, in turn, mounted on an edge of the upright plate 152 by screws 146 and a bearing 158 for the longitudinal control shaft 116 is mounted on the upper end of the bracket.

As heretofore stated, the control pins 84 for the movable cam track sections are driven at different rates at different stations along the length of the sizing zone. For this purpose the gear ratio between the drive pinions 125 and the driven pinions 126 may vary at the different stations. In this instance all of the drive pinions 125 are identical but the driven pinions 126 vary with respect to their number of gear teeth and it is contemplated that the driven pinions 126 will be readily removable to permit substitution of one driven pinion for another in any instance where it is desired to change the rate of movement of the corresponding cam track control pin 84.

Since the driven pinions 126 vary in diameter among the different stations, and since there may be occasion to substitute a driven pinion of one diameter for a driven pinion of a different diameter, each of the drive pinions 125 must be adjustable with respect to its spacing from the axis of the corresponding driven pinion. For this purpose each of the stub shafts 124 that carries a drive pinion 125 as well as a worm gear 122 is journalled in a flanged bearing 160 that is slidingly mounted in a horizontal slot 162 in the upright plate 52. An adjustment screw 165 is rotatably connected at one of its ends to the flanged bearing 160 for adjustment of the bearing along the slot 162. The adjustment screw extends through a threaded bore in the upwardly extending bracket 155 and is provided with a lock nut 166 which may be tightened against the bracket to immobilize the bearing.

It is contemplated that suitable indicating means will be associated with each of the adjustment stations along the length of the sizing zone and for this purpose an indicating means may be operatively connected to each of the cross shafts 132. In the construction shown, a suitable counter 168 is mounted by means of a bracket 170 on one of the housings 133 adjacent one end of each cross shaft 132. As shown in FIG. 10 a drive pinion 172 on the cross shaft 132 meshes with a driven pinion 174 of the counter. The counter has a window 175 to display five numerals and the counter is calibrated to indicate changes in the elevation of the corresponding cam track control pins 84 on opposite sides of the apparatus in increments of .001 inch.

It is apparent that the cam track adjustment motor 114 may be driven in one direction to raise the various sections of the upper cam tracks and may be driven in the opposite direction to lower all of the cam track sections 76a–76e simultaneously. As shown in FIGS. 1 and 2, two limit switches are provided to de-energize the cam track adjustment motor 114 at limit positions of the upper cam track, one limit switch 176 being near the entrance end of the sizing zone to limit elevation of the upper cam track and the other limit switch 177 being near the exit end of the sizing zone to limit the lowering of the upper cam track.

As shown in FIG. 11, the limit switch 176 has a laterally extending operating member 178 and a threaded stud extending upwardly from the upper cam track carries an adjustable nut 182 which is positioned to actuate the operating member. When the upper cam track is elevated to its limit position at the entrance to the sizing zone, the nut 182 contacts the operating member 178 and when the upper track near the exit of the sizing zone is lowered to its limit position, a similar nut on a similar stud lowers to operate the second limit switch 177.

Referring again to the wiring diagram in FIG. 13, the cam track motor 114 is controlled by a three-position switch, generally designated 184, which is movable from a neutral position to energize a contact 185 for driving the motor in a direction to lower the upper cam track and is movable in the opposite respect to energize a contact 186 for driving the cam track motor in a direction to raise the upper cam tracks. The contact 185 is in series with the previously mentioned limit switch 177 and the contact 186 is in series with the previously mentioned limit switch 176 and a second switch 188.

When the knob 95 is manipulated to adjust the control 90 for lowering the torque of the second induction motor 56 at the tail end of the apparatus, a cam 190 on the shaft 96 closes the switch 188 to enable the circuit for operating the cam track motor 114 in the direction to raise the upper cam track. By virtue of this arrangement, the cam track motor 114 cannot be energized to raise the upper cam track unless the control 90 is adjusted to lower the torque of the second induction motor 56. The torque of the second induction motor may be reduced as much as 90%.

The interlocking relationship between the control 90 and the cam track motor 114 solves the problem of facilitating transfer of transverse sizing rolls from the lower run to the upper run when the spacing of the cam tracks is increased to require more sizing rolls in the sizing zone. It has been found that the drastic reduction of the torque of the second induction motor makes the induction motor readily responsive to an increase of the tension of the sprocket chains in the sizing zone. When the cam track spacing is increased, the temporarily weakened motor readily lags in response to the increased tension and thus transfers sizing rolls from the lower run to the sizing zone.

I claim:

1. In an apparatus of the character described for sorting articles by size, wherein a conveyor means having an upper run incorporates transverse sizing members which are connected at their opposite ends to linkages which are incorporated in two parallel continuous sprocket chains which pass around a first drive sprocket means at the head end of the upper run and pass around a second drive sprocket means at the tail end of the upper run, the linkages cooperating with pairs of adjustably spaced cam tracks to control the spacing of the transverse sizing members, said cam tracks acting on the linkages to limit contraction of the spacing of the transverse sizing members in response to tensioning of the two sprocket chains thereby determining the spacing between the successive transverse sizing members, the spacing being increased progressively in a sizing zone towards the tail end of the upper run, the improvement comprising:
first supplemental drive sprocket means in engagement with the upper runs of the two sprocket chains near the first drive sprocket means to define therewith a first zone of the upper run wherein the expanded linkages passing from the first drive sprocket means are contracted to reduce the spacing between the transverse sizing members and to cause the tension in the sprocket chains to drop abruptly at the beginning of the second zone; and
a second supplemental drive sprocket means at the beginning of the sizing zone to cooperate with said first supplemental drive sprocket means to form a second zone in the upper run and to cooperate with said second drive sprocket means to define a third sizing zone of the upper run,
said second supplemental drive sprocket means cooperating with said first supplemental drive sprocket means to keep the transverse sizing members therebetween relatively close together to carry the articles to the sizing zone and to cause the tension of the sprocket chains to drop abruptly at the beginning of the third zone.

2. An improvement as set forth in claim 1 in which said first and second supplemental drive sprocket means are operatively connected with said first drive sprocket means for operation synchronously therewith.

3. An improvement as set forth in claim 2
in which a first actuating means is operatively connected to said first drive sprocket means and to both of said supplemental drive sprocket means for synchronous actuation thereof
and in which a second actuating means is operatively connected to said second drive sprocket means for actuation thereof,
said two actuating means sharing the load of operating the conveyor means and being responsive to changes in the proportioning of the load between the two actuating means to gain or lag relative to each other thereby to transfer transverse sizing members from the lower run to the upper run when the cam tracks are adjusted to require additional transverse sizing members in the sizing zone of the upper run and to transfer transverse sizing members from the upper run to the lower run when the cam tracks are adjusted to require reduction in the number of transverse sizing members in the sizing zone of the upper run.

4. An improvement as set forth in claim 3 which includes means to reduce the power output of the second actuating means when the cam tracks are adjusted to require transfer of transverse sizing members from the lower run to the sizing zone of the upper run.

5. An improvement as set forth in claim 4 which includes means responsive to said power reducing means to prevent increasing of the spacing of the cam tracks unless the power of the second actuating means is substantially reduced.

6. An improvement as set forth in claim 4 in which said first and second actuating means comprise first and second induction motors respectively.

7. An improvement as set forth in claim 1
in which one of said cam tracks of each pair of cam tracks is divided into portions that are vertically movable for changes in the spacing of the two cam tracks;
which includes mechanisms corresponding to said portions to raise and lower the portions;
and which includes a central control means for operating said mechanisms simultaneously for changing the overall cam track configurations.

8. An improvement as set forth in claim 7 which includes means incorporated in said mechanisms respectively for adjusting said portions of the cam tracks at different rates in response to operation of said control means thereby to change the overall configuration of each pair of cam tracks from a configuration for satisfactorily sizing one lot of the articles to a configuration for satisfactorily sizing articles of a different lot.

9. An improvement as set forth in claim 8 in which each of said mechanisms for adjusting a portion of a cam track includes two intermeshed gears comprising a driving gear and a driven gear, the ratio between the two gears varying among the different mechanisms.

10. An improvement as set forth in claim 7 which includes counter means connected to each of at least some of said mechanisms to indicate the adjustment of the corresponding portions of a cam track, said counter means having numerals representing different degrees of adjustments of the corresponding cam track portions.

11. An improvement as set forth in claim 7 in which a first motor is operatively connected to said first drive sprocket means and to both of said supplemental drive sprocket means for synchronous actuation thereof;
in which a second motor is operatively connected to said second drive sprocket means for actuation thereof;
in which the two motors share the load of operating the conveyor means and respond to changes in the proportions of the load imposed on the two motors whereby the two motors rotate relative to each other to transfer transverse sizing members from the lower run to the upper run in response to increase in the spacing of the cam tracks and vice versa;

in which said central control includes motor means for operating all of said mechanisms simultaneously, the motor means being operable in opposite respects for increasing and decreasing the spacing between the two cam tracks;

and which includes means to decrease the power delivered by said second motor when said motor means of the cam track control is energized to increase the spacing of the cam tracks.

12. In an apparatus of the character described for sorting articles by size wherein a conveyor means divided into an upper run to receive the articles and a lower return run includes a continuous series of transverse sizing members interconnected by linkages which engage cooperative upper and lower cam tracks to control the spacing of the transverse sizing members and to cause progressive increase of the spacing of the sizing members in a sizing zone of the upper run, the improvement for controlling the spacing of the cam tracks comprising:

one of said cam tracks being treated into a series of sections each vertically movable for local change in the spacing of the two cam tracks;

a series of mechanisms for raising and lowering the cam track sections;

and a central control means for operating said mechanisms simultaneously for changing the overall configuration of said one cam track, said mechanisms being interconnected and adjusted relative to each other to avoid convergence of the cam tracks in any part of the sizing zone throughout the range of adjustment of the cam tracks by said control means.

13. An improvement as set forth in claim 12 which includes means incorporated in said mechanisms respectively for adjusting the cam track sections at different rates in response to operation of said control means thereby to change the configuration of said one cam track from a configuration for the satisfactory sizing of one lot of the articles to a configuration for the satisfactory sizing of articles of a different lot.

14. An improvement as set forth in claim 13 in which each of said mechanisms includes two intermeshed gears comprising a driving gear and a driven gear, the ratio between the two gears varying among the different mechanisms.

15. An improvement as set forth in claim 12 which includes indicating means operatively connected to each of said mechanisms to indicate the adjustment of the corresponding cam track section.

16. An improvement as set forth in claim 15 in which each of said indicating means comprises a counter having numerals representing different degrees of adjustment of the corresponding mechanism.

17. An improvement as set forth in claim 12 in which said central control includes motor means for operating all of said mechanisms simultaneously, the motor means being operable in opposite respects for increasing and decreasing the spacing between the two cam tracks.

18. An improvement as set forth in claim 17 in which the head end of the conveyor means is actuated by a first motor and the tail end of the conveyor means is operated by a second motor;

in which said two motors share the load of operating the conveyor means and respond to changes in the proportions of the load imposed on the two motors, thereby to cause relative rotation between the two motors to transfer transverse sizing members from the lower run to the upper run when the spacing of the cam tracks is increased and vice versa;

and which includes means to decrease the power delivered by the second motor when said cam track motor means is energized in the direction to increase the spacing of the cam tracks.

19. In an apparatus of the character described for sorting articles by size, wherein a conveyor means having an upper run incorporates transverse sizing members which are connected at their opposite ends to linkages which are incorporated in two parallel continuous sprocket chains which pass around a first drive sprocket means at the head end of the upper run and pass around a second drive sprocket means at the tail end of the upper run, the linkages cooperating with pairs of adjustably spaced cam tracks to control the spacing of the transverse sizing members, said cam tracks acting on the linkages to limit contraction of the spacing of the transverse sizing members in response to tensioning of the two sprocket chains thereby determining the spacing between the successive transverse sizing members, the spacing being increased progressively in a sizing zone towards the tail end of the upper run, the improvement comprising:

the addition of a supplemental drive sprocket means in engagement with the upper runs of the sprocket chains in a region near the first drive sprocket means, said supplemental drive sprocket means rotating at a slower peripheral speed than the first drive sprocket means to cooperate with the first drive sprocket means to crowd the sprocket chains longitudinally to collapse said linkages as they leave the first drive sprocket means thereby to crowd the transverse sizing members together to form a conveyor floor for carrying the articles to the sizing zone.

20. An improvement as set forth in claim 19 in which the upper cam track on each side of the apparatus slopes upwardly from the region of the first drive sprocket means to the region of the supplemental drive sprocket means and slopes upwardly at lesser inclination from the region of the supplemental drive sprocket means to the beginning of the sizing zone whereby the upper cam track forms a first crest in the region of the first supplemental drive sprocket means and a second crest at the beginning of the sizing zone, said supplemental drive sprocket means having the function of boosting the linkages over the first crest.

21. An improvement as set forth in claim 20 which includes a second supplemental drive sprocket means in the region of the second crest to boost the linkages over the second crest and to cooperate with the first drive sprocket means to maintain tension in the sprocket chains in the sizing zone.

References Cited

UNITED STATES PATENTS

| | | | |
|---|---|---|---|
| 2,917,170 | 12/1959 | Flodin | 209—106 |
| 3,207,309 | 9/1965 | Ernst | 209—102 |
| 3,272,334 | 9/1966 | Russell | 209—106 |

ALLEN N. KNOWLES, Primary Examiner

U.S. Cl. X.R.

209—106

PO-1050
(5/69)

UNITED STATES PATENT OFFICE
CERTIFICATE OF CORRECTION

Patent No. 3,458,043　　　　　　　　　Dated　July 29, 1969

Inventor(s)　Paul F. Paddock

It is certified that error appears in the above-identified patent and that said Letters Patent are hereby corrected as shown below:

Column 11, lines 55 and 56, "extend" should read --extending--. Column 15, line 24, "treated" should read --divided--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents